United States Patent Office 3,282,962
Patented Nov. 1, 1966

3,282,962
(OPTIONALLY 17-ALKYLATED)-17-OXYGENATED-
3-OXA-5α-ANDROSTAN-2-ONES AND INTERMEDIATES THERETO
Raphael Pappo, Skokie, and Mike G. Scaros, Arlington Heights, Ill., assignors to G. D. Searle & Co., Chicago, Ill., a corporation of Delaware
No Drawing. Filed Dec. 21, 1964, Ser. No. 420,204
10 Claims. (Cl. 260—343.2)

The present invention relates to novel hetero-cyclic steroidal derivatives characterized by a 3-oxa substituent and, more particularly, to (optionally 17-alkylated)-17-oxygenated-3-oxa-5α-androstan-2-ones, which are encompassed by the following structural formula

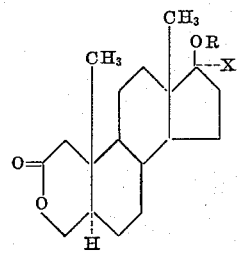

wherein R is hydrogen or a lower alkanoyl radical and X can be either hydrogen or a lower alkyl radical.

The lower alkyl radicals symbolized in the foregoing representation are typified by methyl, ethyl, propyl, butyl, pentyl, hexyl and the branched-chain isomers thereof. The term "lower alkanoyl" refers to those radicals represented by the formula

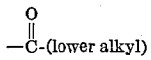
—C—(lower alkyl)

The 3-oxa compounds of this invention are manufactured from novel intermediates which are produced by a novel process. That process involves the oxygenation of a 3-keto starting material of the structural formula

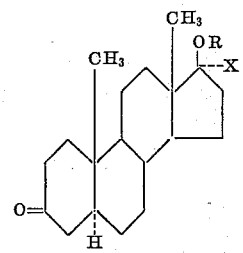

wherein R and X represent the same substituents as indicated above, to afford 2,3-seco intermediates of the structural formula

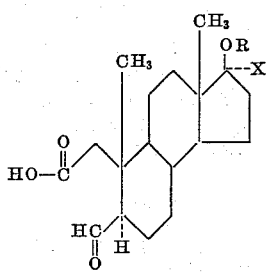

In that process, the corresponding 2,3-diones are produced as intermediates. Pure oxygen gas or atmospheric oxygen may be utilized although the reaction proceeds more rapidly as the concentration of oxygen is increased. For optimum yields it is preferred that a strongly alkaline catalyst be present. Suitable catalysts are alkali metal and alkaline earth metal alkoxides such as potassium tertiarybutoxide, sodium ethoxide, potassium ethoxide, sodium methoxide, and magnesium ethoxide; alkali metal hydroxides such as potassium hydroxide and sodium hydroxide; and quaternary ammonium hydroxides such as benzyl trimethyl ammonium hydroxide. Suitable solvents are the alkanols corresponding to those alkoxides. Co-solvents such as benzene, dioxane, and pyridine may be utilized in the instances where increased solubility is desired. The process is conveniently conducted at pressures as low as one atmosphere and at temperatures at or near room temperature. A specific example of this process is the reaction of 17β-hydroxy-17α-methyl-5α-androstan-3-one with oxygen gas in tertiary-butyl alcohol containing potassium tertiary-butoxide at room temperature and a pressure of 1–2 atmospheres to yield initially 17β-hydroxy-17α-methyl-5α-androstane-2,3-dione which is oxidized further to afford 17β-hydroxy-17α-methyl-3-oxo-2,3-seco-A-nor-5α-androstan-2-oic acid.

Reduction of the aforementioned 2,3-seco intermediates affords the 3-oxa compounds of the present invention. Thus, 17β-hydroxy-17α-methyl-3-oxo-2,3-seco-A-nor-5α-androstan-2-oic acid is contacted with sodium borohydride in aqueous methanol to afford 3,17β-dihydroxy-17α-methyl-2,3-seco-A-nor-5α-androstan-2-oic acid, which spontaneously cyclizes to produce 17β-hydroxy-17α-methyl-3-oxa-5α-androstan-2-one.

The instant lactones, as obtained in crude form from the reaction mixture, contain as an impurity a significant quantity of the corresponding 2-oxa-3-oxo lactones. Separation of that contaminant can be effected by fractional crystallization or, more conveniently, by selective alkaline hydrolysis of the 2-oxa lactone followed by extraction of the instant 3-oxa lactone from the alkaline mixture with a suitable organic solvent.

The 17-(lower alkanoyl)oxy compounds of this invention are alternatively produced by reaction of the 17-hydroxy precursor with a lower alkanoic acid anhydride or halide, preferably in the presence of a suitable acid acceptor. Thus, the instant 17β-hydroxy-3-oxa-5α-androstan-2-one is contacted with acetic anhydride and pyridine to yield 17β-acetoxy-3-oxa-5α-androstan-2-one.

Equivalent to the instant lactones are the corresponding hydroxy-acids and salts thereof represented by the following structural formula

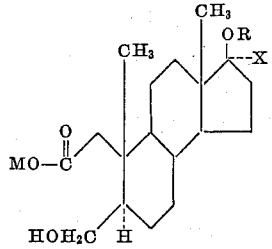

wherein M is hydrogen or an alkali metal, alkaline earth or ammonium radical, and R and X are as hereinbefore defined.

The compounds of this invention display valuable pharmacological properties. They are hormonal agents, for example, as is evidenced by their anabolic and androgenic properties.

The invention will appear more fully from the examples which follow. These examples are set forth by way of illustration only and it will be understood that the invention is not to be construed as limited either in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

*Example 1*

A solution of potassium tertiary-butoxide in tertiary-butyl alcohol is prepared by adding 3.2 parts of potassium metal to 160 parts of tertiary-butyl alcohol and heating that mixture at the reflux temperature, under nitrogen, until the metal is completely dissolved. At that point 17β-hydroxy-17α-methyl-5α-androstan-3-one is added. The resulting mixture is then shaken in an oxygen atmosphere at a pressure of 10–30 pounds per square inch for about 5 days. Completion of the reaction is indicated by the cessation of formation of carbon monoxide gas in the mixture. At the end of the reaction period, the mixture containing 17β-hydroxy-17α-methyl-3-oxo-2,3-seco-A-nor-5α-androstan-2-oic acid is diluted with 240 parts of methanol and 150 parts of water. To that mixture is then added 24 parts of sodium borohydride, and the resulting solution is allowed to stand at room temperature for about 16 hours. Following that reaction period, approximately 100 parts of water is added, and the volatile solvents are removed by distillation under reduced pressure. A small amount of insoluble material is removed by filtration, and the filtrate is extracted with chloroform. The aqueous layer is separated and made strongly acidic by the addition of hydrochloric acid, and that acidic solution is extracted with chloroform. The chloroform solution is washed with cold 5% aqueous sodium hydroxide, then is dried over anhydrous sodium sulfate and stripped of solvent under reduced pressure. The resulting crude product, consisting of a mixture of 17β-hydroxy-17α-methyl-3-oxa-5α-androstan-2-one and 17β-hydroxy-17α-methyl-2-oxa-5α-androstan-3-one, is dissolved in 80 parts of methanol, and a solution of 2 parts of sodium hydroxide in 2 parts of water is added. The resulting solution is kept at room temperature for about 5 minutes, then is extracted with benzene. The benzene layer is separated, washed with water, dried over anhydrous sodium sulfate and stripped of solvent under reduced pressure. The resulting oily residue is recrystallized from isopropyl alcohol to afford pure 17β-hydroxy-17α-methyl-3-oxa-5α-androstan-2-one, melting at about 213–217°. This compound is represented by the following structural formula

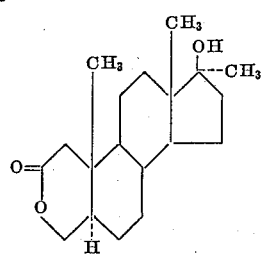

As an alternative to the above-described preferential hydrolysis purification procedure, the crude mixture is separated by fractional crystallization first from benzene, then from isopropyl alcohol to afford 17β-hydroxy-17α-methyl-3-oxa-5α-androstan-2-one and also 17β-hydroxy-17α-methyl-2-oxa-5α-androstan-3-one, melting at about 220–225°.

*Example 2*

By substituting an equivalent quantity of 17α-ethyl-17β-hydroxy-5α-androstan-3-one and otherwise proceeding according to the processes described in Example 1, there are obtained 17α-ethyl-17β-hydroxy-3-oxo-2,3-seco-A-nor-5α-androstan-2-oic acid and 17α-ethyl-17β-hydroxy-3-oxa-5α-androstan-2-one.

*Example 3*

A mixture of 3.5 parts of potassium metal and 160 parts of tertiary-butyl alcohol is heated at the reflux temperature, in a nitrogen atmosphere, for about 2 hours, during which time the metal completely dissolves. To the resulting solution is added 25 parts of 17β-hydroxy-5α-androstan-3-one, and the resulting reaction mixture is shaken in an oxygen atmosphere at an initial pressure of 30 pounds per square inch for about 73 hours. The gaseous atmosphere is replaced by fresh oxygen every 12 hours. At the end of each period, the gaseous atmosphere is tested for carbon monoxide gas, using palladous chloride. The resulting solution, containing 17β-hydroxy-3-oxo-2,3-seco-A-nor-5α-androstan-2-oic acid, is diluted with 200 parts of methanol and 150 parts of water, and 25 parts of sodium borohydride is then added. The resulting mixture is kept at room temperature for about 16 hours, then is filtered to remove a small amount of insoluble material and is washed with chloroform. The aqueous layer is made acidic by the addition of hydrochloric acid and is extracted with chloroform. A small amount of insoluble material is removed by filtration, and the chloroform filtrate is washed with dilute aqueous sodium bicarbonate, then is dried over anhydrous sodium sulfate and stripped of solvent under reduced pressure. To that residue is added 30 parts of pyridine and 15 parts of acetic anhydride, and the resulting reaction mixture is kept at room temperature for about 22 hours. The reaction mixture is diluted with ice, then is stirred for about 2 hours. The crystalline product is collected by filtration and recrystallized first from methylene chloride-hexane, then from methanol to afford pure 17β-acetoxy-3-oxa-5α-androstan-2-one, melting at about 174–177°. This compound is represented by the following structural formula

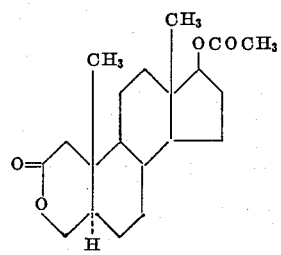

*Example 4*

The substitution of an equivalent quantity of propionic anhydride in the procedure of Example 3 results in 3-oxa-17β-propionoxy-5α-androstan-2-one.

*Example 5*

To a solution of 1.5 parts of 17β-acetoxy-3-oxa-5α-androstan-2-one in 32 parts of methanol is added a solution of 1.5 parts of sodium hydroxide in 20 parts of water. The resulting reaction mixture is heated on a steam bath for about 2 hours, then is stripped of methanol by distillation under reduced pressure. Acidification of the aqueous solution with hydrochloric acid results in precipitation of the crystalline product, which is collected by filtration, then purified by recrystallization from benzene to afford pure 17β-hydroxy-3-oxa-5α-androstan-2-one, melting at about 173–174.5°. This compound can be represented by the following structural formula

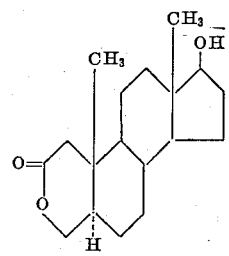

What is claimed is:
1. A compound of the formula

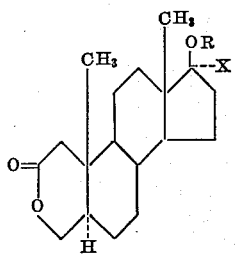

wherein R is a member of the class consisting of hydrogen and a lower alkanoyl radical, and X is selected from the group consisting of hydrogen and a lower alkyl radical.
2. 17β-hydroxy-3-oxa-5α-androstan-2-one.
3. A compound of the formula

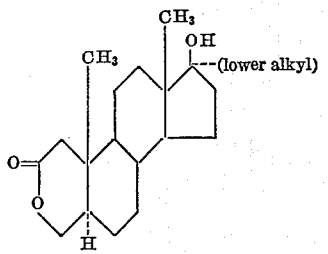

4. 17β-hydroxy-17α-methyl-3-oxa-5α-androstan-2-one.
5. A compound of the formula

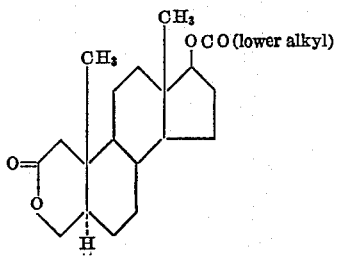

6. 17β-acetoxy-3-oxa-5α-androstan-2-one.
7. The process which comprises contacting a compound of the formula

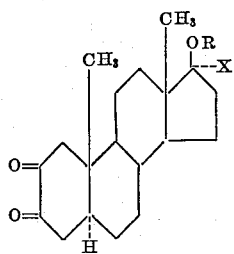

wherein R is a member of the class consisting of hydrogen and a lower alkanoyl radical and X is selected from the group consisting of hydrogen and a lower alkyl radical, with oxygen in the presence of an alkaline catalyst.
8. A compound of the formula

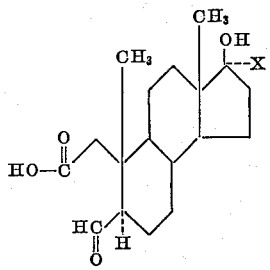

wherein X is selected from the group consisting of hydrogen and a lower alkyl radical.
9. 17β - hydroxy-3-oxo-2,3-seco-A-nor-5α-androstan-2-oic acid.
10. 17β - hydroxy-17α-methyl-3-oxo-2,3-seco-A-nor-5α-androstan-2-oic acid.

No references cited.

WALTER A. MODANCE, *Primary Examiner.*

JAMES A. PATTEN, *Assistant Examiner.*